(12) United States Patent
Kurzeja

(10) Patent No.: US 7,736,238 B2
(45) Date of Patent: Jun. 15, 2010

(54) RETAINED NEEDLE THRUST WASHER

(75) Inventor: Patrick L. Kurzeja, White Lake, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 279 days.

(21) Appl. No.: 11/678,086

(22) Filed: Feb. 23, 2007

(65) Prior Publication Data
US 2008/0207340 A1     Aug. 28, 2008

(51) Int. Cl.
*F16D 3/41* (2006.01)
(52) U.S. Cl. .................... 464/132; 384/127; 29/898.041
(58) Field of Classification Search .................. 464/128, 464/131–133, 136; 384/126–127, 448; 29/428, 29/469, 898.041
See application file for complete search history.

(56) References Cited

U.S. PATENT DOCUMENTS

| | | | | |
|---|---|---|---|---|
| 3,414,341 A | * | 12/1968 | Murphy | |
| 4,130,325 A | * | 12/1978 | Schultenkamper | 464/131 |
| 4,783,182 A | * | 11/1988 | Caron et al. | |
| 5,106,342 A | * | 4/1992 | Fisher | 464/132 |
| 6,827,649 B2 | * | 12/2004 | Menosky et al. | 464/132 |

* cited by examiner

*Primary Examiner*—Greg Binda
(74) *Attorney, Agent, or Firm*—Carlson, Gaskey & Olds

(57) ABSTRACT

A trunnion of a universal joint cross-shaped member supports a bearing cup, thrust washer, and needle bearing assembly. The thrust washer includes a first surface that faces the bearing cup and a second surface that faces an end face of the trunnion. A first lip extends outwardly from the first surface to contact the bearing cup and a second lip extends outwardly from the second surface to contact the needle bearing assembly. The first and second lips cooperate to hold the bearing cup and needle bearing assembly in a proper installation for final assembly to form a universal joint assembly.

20 Claims, 3 Drawing Sheets

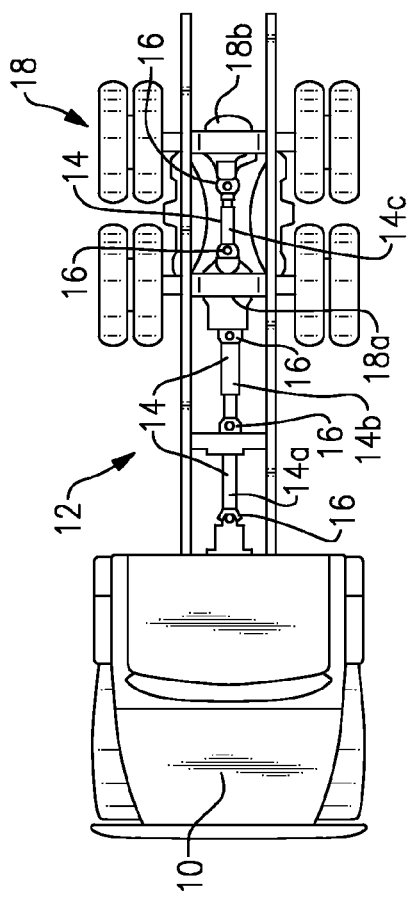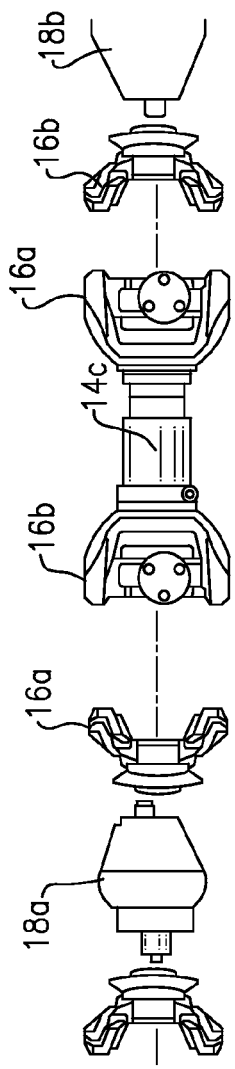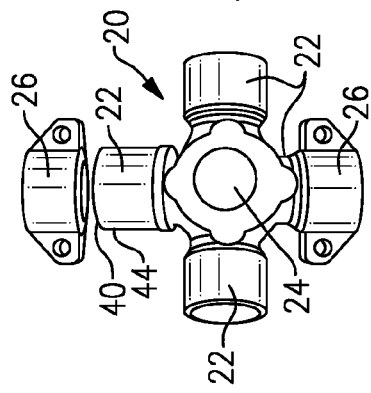

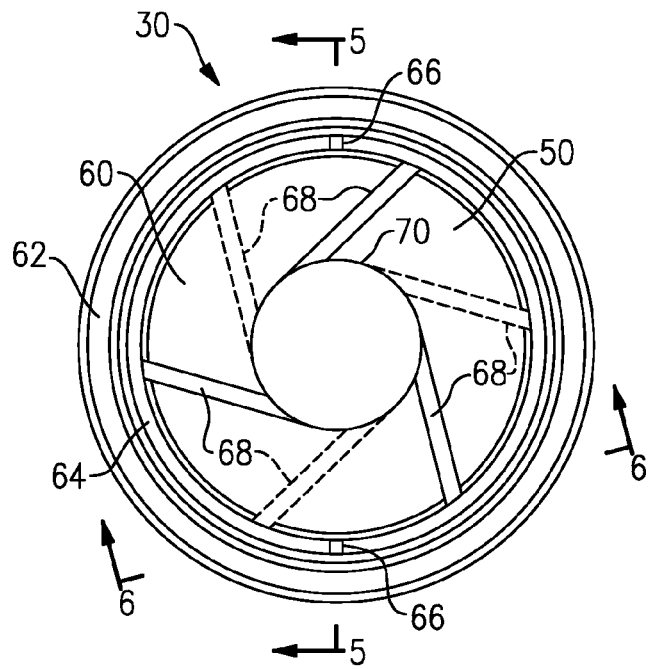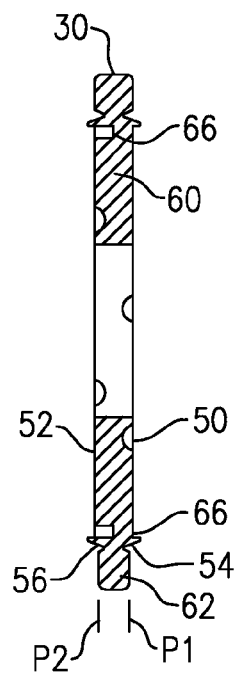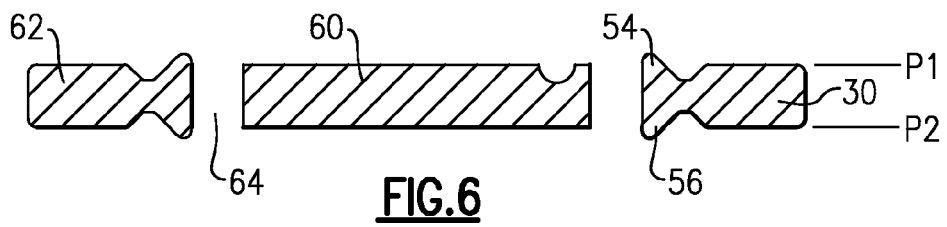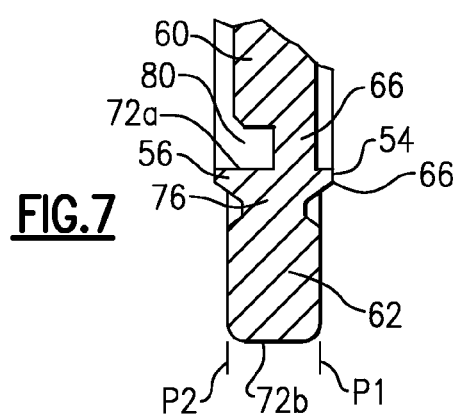

RETAINED NEEDLE THRUST WASHER

TECHNICAL FIELD

A thrust washer for a universal joint assembly includes interference features that prevent needle bearings from being dislodged.

BACKGROUND OF THE INVENTION

Universal joints comprise two yoke members that are coupled together with a bearing cross member. The bearing cross member comprises a cross-shaped component having four (4) trunnions, with a bearing cup and needle bearing assembly supported on each trunnion. A thrust washer is positioned between an end face of each trunnion and an associated bearing cup to accommodate thrust loads during operation of the universal joint assembly.

Needle bearings are installed within the bearing cup and surround an outer circumferential surface of the trunnion. Traditionally, the thrust washer includes a first surface that faces the bearing cup and a second surface that rests on top of end surfaces of the needle bearings and trunnion. The thrust washer and needle bearings are loosely fit within an area defined between the bearing cup and the trunnion such that gaps can be formed between the thrust washer and bearing cup, and between the needle bearings and trunnion and/or bearing cup.

Typically, the gaps are filled by grease or lubricant, however, the grease/lubricant is not structurally sufficient to hold the needle bearings and/or bearing cups in a proper installation position during shipping and handling. Consequently, needle bearings can become dislodged during shipping and handling of the cross member. Further, the movement of the needle bearings can affect the position of the bearing cup such that the cross member and bearing cups will not assemble properly with the yoke members to form the universal joint assembly.

Thus, there is a need for a mechanism to retain and hold the needle bearings in a proper installation position and to prevent dislodgement.

SUMMARY OF THE INVENTION

A thrust washer for a universal joint assembly includes interference features that prevent needle bearings from being dislodged. The thrust washer is installed between an end face of a trunnion and a bearing cup that is supported on the trunnion. The thrust washer includes first and second surfaces that face opposite of each other, with at least one of the first and second surfaces including an interference feature comprising a lip. The lip provides interference during initial handling to hold the needle bearings in a proper installation position. The lip is subsequently deformed by assembly and operational forces of the universal joint assembly.

In one disclosed example, the thrust washer comprises a disc-shaped body with the first surface facing the bearing cup and the second surface facing an end face of the trunnion. A first lip extends outwardly from a first plane defined by the first surface, and a second lip extends outwardly from a second plane defined by the second surface. The first lip contacts the bearing cup and the second lip contacts the needle bearings. The first and second lips form interference features that hold the bearing cup and needle bearings in proper installation positions during handling. The first and second lips are subsequently plastically deformed out of an interference position by assembly and operational forces of the universal joint such that the bearing cup and needle bearings can perform normal operations.

These and other features of the present invention can be best understood from the following specification and drawings, the following of which is a brief description.

BRIEF DESCRIPTION OF THE DRAWINGS

FIG. 1 is a schematic environmental view of a driveline system for a vehicle incorporating the subject invention.

FIG. 2 is a front view of a bearing cross and cup assembly for a universal joint.

FIG. 4 is a top view of the thrust washer of FIG. 3.

FIG. 5 is a cross-sectional view taken along 5-5 of FIG. 4.

FIG. 6 is a cross-sectional view taken along 6-6 of FIG. 4.

FIG. 7 is a magnified view of detail 7 indicated in FIG. 5.

DETAILED DESCRIPTION OF THE PREFERRED EMBODIMENT

Figure 3:
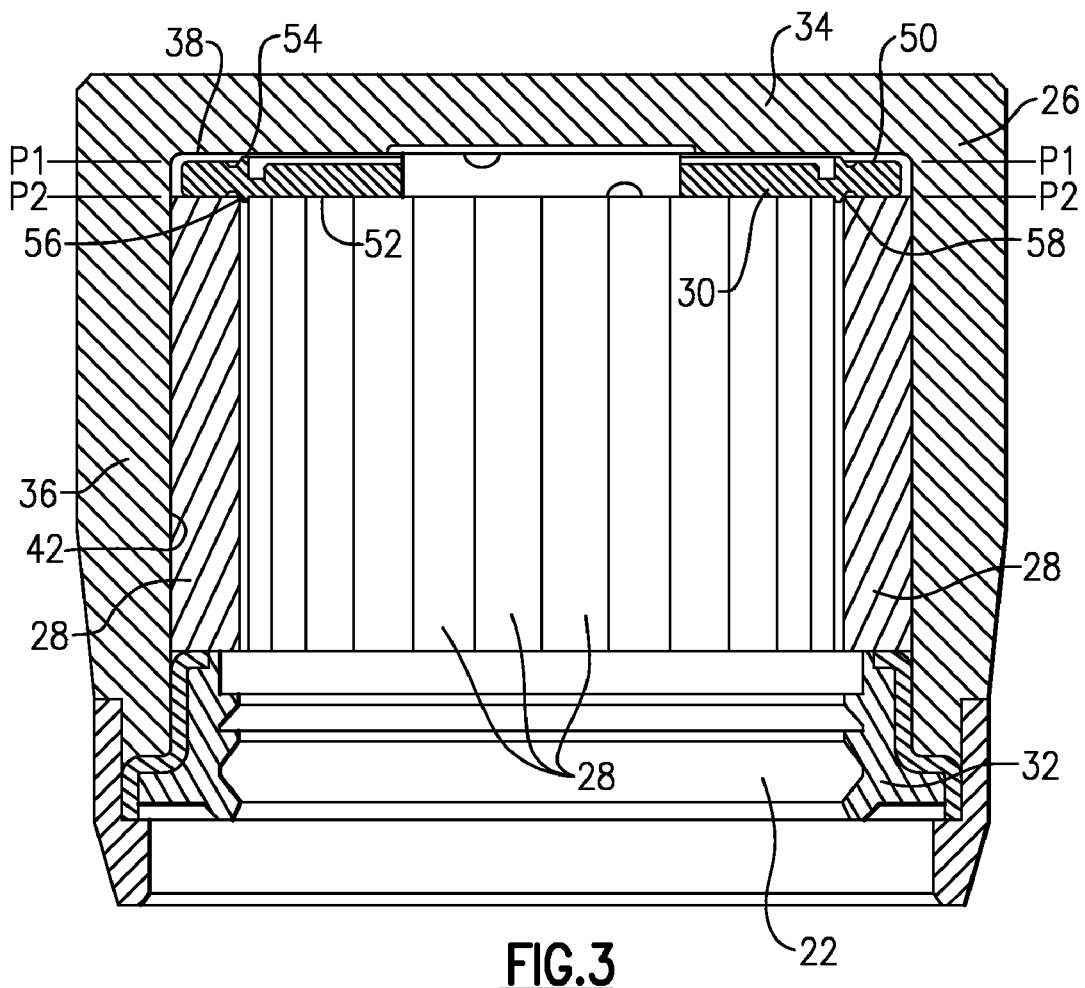
FIG. 3 is a cross-sectional view of one trunnion of the bearing cross and cup assembly and includes a thrust washer incorporating the subject invention.

A vehicle 10 includes an example driveline system 12 having driveshaft sections 14 that are coupled together with universal joints 16. In the example shown, forward driveshaft sections 14a, 14b provide driving input to a tandem axle assembly 18. The tandem axle assembly 18 includes a front axle 18a that is coupled to a rear axle 18b with a rearward driveshaft section 14c. Adjoining driveshaft sections 14 are coupled together with a universal joint 16 that includes a first yoke member 16a and a second yoke member 16b that are each coupled to a cross member 20, shown in FIG. 2.

The cross member 20 includes a plurality of trunnions 22 that extend outwardly from a center body 24 to form the shape of a cross. Each trunnion 22 supports a bearing cup 26 (only two are shown). Opposing pairs of trunnions 22 are coupled to one of the first 16a and second 16b yoke members as known. Inside of each bearing cup 26 is a plurality of needle bearings 28 that surround the trunnion 22 and a thrust washer 30, as shown in FIG. 3. The thrust washer 30 includes interference features that prevent the needle bearings 28 from being dislodged during shipping and handling such that the needle bearings 28 and bearing cup 26 are maintained in a proper position for final installation to form a universal joint. This will be discussed in greater detail below. The subject thrust washer 30 can be used with any type of universal joint and can be incorporated into any type of driveline system. The configuration of FIG. 1 is just one example of a system that utilizes the thrust washer 30.

As shown in FIG. 3, each trunnion 22 is surrounded by the needle bearings 28 which are housed within an interior cavity defined by the bearing cup 26. A seal 32 can be installed to seal lubricant within the cavity. The bearing cup 26 includes a base portion 34 with a cylindrical wall portion 36 that surrounds an end of the trunnion 22. The base portion 34 includes an inner surface 38 that faces an end face 40 (FIG. 2) of the trunnion 22. The cylindrical wall portion 36 includes an inner surface 42 that faces the needle bearings 28. The needle bearings 28 are positioned directly between this inner surface 42 and a side surface 44 (FIG. 2) of the trunnion 22.

The thrust washer 30 is positioned directly between the end face 40 of the trunnion 22 and the inner surface 38 of the base portion 34 of the bearing cup 26. The thrust washer 30 includes a first surface 50 that faces the inner surface 38 and a second surface 52 that faces the end face 40. The thrust washer 30 is a generally disc-shaped member with the first 50 and second 52 surfaces being generally flat and defined by first P1 and second P2 planes, respectively.

A first extension or lip 54 extends outwardly from the first plane P1 defined by the first surface 50. The first lip 54 extends to contact the base portion 34 of the bearing cup 26. A second extension or lip 56 extends outwardly from the second plane P2 defined by the second surface 52. The second lip 56 extends to contact a corner portion 58 of the needle bearings 28. By contacting the corner portion 58, the thrust washer 30 provides a holding load on both an end face and a side face of the needle bearings 28.

The first 54 and second 56 lips form interference features that cooperate to prevent the needle bearings 28 from being dislodged during shipping and handling. The first 54 and second 56 lips also help hold and maintain the needle bearings and bearing cup 26 in a proper position for final installation into yokes to form a universal joint 16.

The thrust washer is shown in greater detail in FIGS. 4-7. FIG. 4 shows a top view of the thrust washer 30 looking down onto the first surface 50. The thrust washer includes an inner ring portion 60 and an outer ring portion 62 that is spaced radially outwardly from the inner ring portion 60 by a gap 64. The outer ring portion 62 is temporarily connected to the inner ring portion 60 by at least one tang 66 that extends across the gap 64. In the configuration shown, two tangs 66 are utilized. The purpose of the tangs 66 will be discussed in greater detail below.

The inner ring portion 60 is generally positioned on top of the end face 40 of the trunnion 22. The outer ring portion 62 is generally positioned on top of the end faces of the needle bearings 28. The tangs 66 bridge the gap 64 which is positioned generally between the trunnion 22 and the needle bearings 28.

The first surface 50 includes a plurality of grooves or channels 68 that are formed within the inner ring portion 60. The channels 68 extend from a center opening 70 of the thrust washer 30 across the first surface 50 to outer edges of the inner ring portion 60. The channels 68 direct a lubricating substance, such as grease for example, to the needle bearings 28. Channels 68 can also be formed on the second surface 52 as indicated in dashed lines.

The connection interface between the inner 60 and outer 62 ring portions is shown in greater detail in FIGS. 5 and 6. FIG. 5 shows a section taken across the thrust washer 30 at a location that includes the tangs 66. FIG. 6 shows a section taken across the thrust washer 30 that does not include the tangs 66. The thrust washer 30 includes a first installation position in which the tangs 66 connect the inner 60 and outer 62 ring portions and a second installation position in which the tangs 66 are broken such that the inner 60 and outer 62 ring portions can move independently from each other.

During initial shipping and handling of the cross member 20 and the bearings cups 26, the thrust washer 30 is in the first installation position. Once the cross member 20 is fully installed within a universal joint 16 and is subjected to operational loading, the tangs 66 are designed to break such that the inner 60 and outer 62 ring portions can move independently of each other. This accommodates different rotational movement of the trunnion 22 and the needle bearings 28 during vehicle operation. When the tangs 66 are broken, the thrust washer 30 is in the second installation position with the gap 64 (as shown in FIG. 6) extending about the entirety of the outer circumference of the inner ring portion 60.

As shown in FIG. 7, the outer ring portion 62 includes an inner circumferential edge 72a and an outer circumferential edge 72b. The inner circumferential edge 72a faces the inner ring portion 60. The first 54 and second 56 lips are formed in the outer ring portion 62 at or near the inner circumferential edge 72a. A narrow portion 76 extends inwardly toward the inner circumferential edge 72a of the outer ring portion 62. The narrow portion 76 has a thickness that is less than a thickness of the outer ring portion 62 at the outer 72b circumferential edge. The first 54 and second 56 lips are formed to extend from the narrow portion 76. In the example shown, the narrow portion 76 extends in a direction generally parallel to the first P1 and second P2 planes and the first 54 and second 56 lips each include a portion that extends generally perpendicular to the first P1 and second P2 planes.

The tangs 66 are located radially inwardly of the first 54 and second 56 lips. The tangs 66 are defined by a thickness that is less than a thickness of each of the inner 60 and outer 62 ring portions. This forms a notch 80 between the inner 60 and outer 62 ring portions. The notch 80 is located between the second lip 56 and the inner ring portion 60.

As discussed above, the first 54 and second 56 lips form interference features that prevent the needle bearings 28 from being dislodged during shipping and handling. These interference features are deformed during subsequent assembly and operational forces of the universal joint 16.

Figure 8:
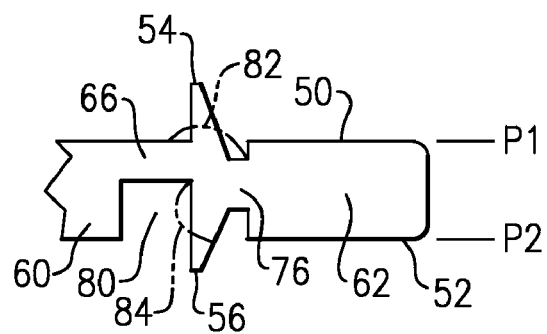
FIG. 8 is similar to FIG. 7 but shows deformation of interference features.

FIG. 8 shows the first 54 and second 56 lips in a deformed configuration. The first lip 54, which contacts the bearing cup 26, typically deforms during connection of the bearing cross member 20 and bearing cups 26 to yokes to form a fully assembled universal joint 16. Thus, the first lip 54 is movable from an initial installation position in which an outermost portion of the first lip 54 extends outwardly beyond the first plane P1 by a first distance to a final installation position in which the outermost portion is at a second distance that is closer to the first plane P1 than the first distance. In this final installation position, the first lip 54 comprises a plastically deformed portion 82, indicated by the dashed lines in FIG. 8.

The second lip 56, which contacts the corner portion 58 of the needle bearings 28, typically deforms during operational loading of the universal joint 16. Frictional contact of the needle bearings 28 and trunnion 22 against the second lip 56 causes the second lip to plastically deform into portion 84 as indicated by dashed lines in FIG. 8. Thus, the second lip 56 is movable from an initial installation position in which an outermost portion of the second lip 56 extends outwardly beyond the second plane P2 by a first distance to a final installation position in which the outermost portion is at a second distance that is closer to the second plane P2 than the first distance.

The subject invention provides a unique thrust washer configuration with interference features that prevent needle bearing dislodgment during shipping and handling. These interference features are subsequently deformed during final assembly and operation of the universal joint such that the interference features do not adversely affect normal operating performance of bearing surfaces within the universal joint. Further, the unique thrust washer configuration is symmetrical and is handled similarly to traditional thrust washers in installation procedures.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A thrust washer for a universal joint assembly comprising:
   a disc-shaped washer body having a first surface adapted to face a bearing cup and a second surface facing opposite the first surface;
   a first lip extending outwardly from said first surface to contact the bearing cup; and
   a second lip extending outwardly from said second surface to contact a corner portion of at least one needle bearing to be housed within the bearing cup.

2. The thrust washer according to claim 1 wherein said disc-shaped body comprises an inner ring portion and an outer ring portion spaced radially outwardly from said inner ring portion by a gap, said inner ring portion and said outer ring portion being connected to each other by at least one tang that extends across said gap.

3. The thrust washer according to claim 2 wherein said outer ring portion includes an outer circumferential edge and an inner circumferential edge that faces said inner ring portion, and wherein said first and said second lips are formed as part of said outer ring portion at said inner circumferential edge.

4. The thrust washer according to claim 2 wherein said inner ring portion and said outer ring portion provide a first installation position in which said inner and said outer ring portions are connected to each other by said at least one tang, and a second installation position in which said at least one tang breaks under an operational load such that said inner and outer ring portions move independently from each other.

5. The thrust washer according to claim 1 wherein said first lip is movable from an initial installation position in which an outermost portion of said first lip extends outwardly beyond said first surface by a first distance to a final installation position in which said outermost portion of said first lip is at a second distance that is closer to said first surface than said first distance.

6. The thrust washer according to claim 5 wherein said first lip comprises a plastically deformed portion when in said final installation position.

7. A universal joint assembly comprising:
   at least one trunnion;
   a plurality of needle bearings surrounding a distal end portion of said at least one trunnion;
   a bearing cup supported by said distal end portion of said at least one trunnion, said bearing cup including a base portion facing an end face of said at least one trunnion and a wall portion extending from said base portion to enclose said plurality of needle bearings within said bearing cup; and
   a thrust washer having a first surface that faces said base portion and a second surface that faces said end face of said at least one trunnion, said thrust washer including at least one lip extending outwardly from one of said first and second surfaces.

8. The universal joint assembly according to claim 7 wherein said at least one lip comprises a first lip extending outwardly from said first surface, and a second lip extending outwardly from said second surface.

9. The universal joint assembly according to claim 8 wherein said thrust washer comprises a disc-shaped body having an inner ring portion and an outer ring portion spaced radially outwardly from said inner ring portion by a gap, and wherein said first and said second lips are formed as part of said outer ring portion.

10. The universal joint assembly according to claim 9 wherein said outer ring portion includes an outer circumferential edge that faces said wall portion of said bearing cup and an inner circumferential edge that faces said inner ring portion, with an extension portion extending radially inwardly from said inner circumferential edge, wherein said first and said second lips are formed as part of said extension portion.

11. The universal joint assembly according to claim 10 wherein said extension portion extends in a direction generally parallel to said first and second surfaces and wherein said first and said second lips each include a portion that extends generally perpendicular to said first and second surfaces.

12. The universal joint assembly according to claim 10 wherein said inner ring portion and said outer ring portion are connected to each other by at least one tang that extends across said gap, with said inner ring portion and said outer ring portion cooperating to provide a first installation position in which said inner and said outer ring portions are connected to each other by said at least one tang, and a second installation position in which said at least one tang breaks under loading such that said inner and outer ring portions may move independently from each other.

13. The universal joint assembly according to claim 8 wherein said first lip is in direct contact with said base portion of said bearing cup and wherein said second lip is in direct contact with a corner portion of at least one of said plurality of needle bearings, said corner portion comprising an end surface and an associated side surface of a needle bearing.

14. The universal joint assembly according to claim 8 wherein at least one of said first and second lips is movable from an initial installation position in which an outermost portion of said at least one of said first and second lips extends outwardly beyond a respective one of said first and second surfaces by a first distance to a final installation position in which said outermost portion of said at least one of said first and second lips is at a second distance that is closer to said respective one of said first and second surfaces than said first distance.

15. The universal joint assembly according to claim 14 wherein said at least one of said first and second lips comprises a plastically deformed portion when in said final installation position.

16. The universal joint assembly according to claim 14 wherein both of said first and second lips are movable from said initial installation position to said final installation position, and wherein both of said first and second lips comprise plastically deformed portions when in said final installation position.

17. The universal joint assembly according to claim 7 wherein said at least one lip extends to contact a corner portion of said plurality of needle bearings.

18. The universal joint assembly according to claim 17 wherein said at least one lip comprises a first lip that contacts said corner portion and a second lip that contacts said base portion of said bearing cup.

19. A method of assembling a universal joint assembly comprising the steps of:
   (a) providing a thrust washer having a first surface that faces a base portion of a bearing cup and a second surface that faces an end face of at least one trunnion, the thrust washer including a first lip that extends outwardly from the first surface and a second lip that extends outwardly from a the second surface;
   (b) assuming a first installation position by contacting the first lip against the base portion of the bearing cup and contacting the second lip against a corner portion of at least one needle bearing, the corner portion comprising end and side surfaces, the at least one needle bearing positioned between an outer surface of the at least one trunnion and an inner surface of the bearing cup to hold the bearing cup and the at least one needle bearing in proper installation position for connection to a universal joint assembly; and (c) plastically deforming at least one of the first and second lips during assembly of the at least one trunnion into the universal joint assembly.

20. The method according to claim 19 wherein step (c) includes plastically deforming both the first and second lips.

* * * * *